United States Patent [19]

Østergaard

[11] Patent Number: 4,610,563
[45] Date of Patent: Sep. 9, 1986

[54] DOWEL FOR ASSEMBLING FURNITURE PARTS

[76] Inventor: Steen Østergaard, 16 Jahnsensvej, Gentofte DK-2820, Denmark

[21] Appl. No.: 618,395
[22] PCT Filed: Sep. 28, 1983
[86] PCT No.: PCT/DK83/00090
 § 371 Date: May 31, 1984
 § 102(e) Date: May 31, 1984
[87] PCT Pub. No.: WO84/01410
 PCT Pub. Date: Apr. 12, 1984

[30] Foreign Application Priority Data

Oct. 5, 1982 [DK] Denmark .............................. 4416/82

[51] Int. Cl.⁴ ..................... F16B 12/36; F16B 13/04
[52] U.S. Cl. .................................. 403/295; 403/316; 403/354; 403/381
[58] Field of Search ............... 403/381, 354, 289, 316, 403/248, 331, 361, 295, 292

[56] References Cited

U.S. PATENT DOCUMENTS 1,285,869  11/1918  Wineman ............................ 403/354
3,985,083  10/1976  Pofferi ................................ 403/381
4,082,470   4/1978  Alberts ............................... 403/295
4,099,887   7/1978  Mackenroth ....................... 403/381
4,300,271  11/1981  Wohlhaupter ...................... 403/381
4,357,744  11/1982  McKenzie et al. ................. 403/295

Primary Examiner—Cornelius J. Husar
Assistant Examiner—Peter M. Cuomo
Attorney, Agent, or Firm—Fitch, Even, Tabin & Flannery

[57] ABSTRACT

A dowel for assembling furniture parts comprises parts (3, 4) adapted to engage by snap action adjacent parts of another dowel. To facilitate the handling of such dowels the engaging parts (3, 4) are placed together in the same end of the individual dowel and constructed to engage separately corresponding parts of another dowel. One part (3) has the form of a protruding part, whereas the other part (4) has the form of a receiving part. The insertion of the protruding part (3) in a receiving part (4) is facilitated by a slit (24) which makes the protruding part yield. The protruding part (3) and the receiving part (4) may be formed in connection with plane surfaces (5 and 6) forming an angle of 90° with each other, so that dowels of the type described can be used for assembling furniture parts abutting each other perpendicularly, in an angle joint as well as in T-joints and cross joints.

7 Claims, 13 Drawing Figures

U.S. Patent  Sep. 9, 1986  Sheet 2 of 2  4,610,563
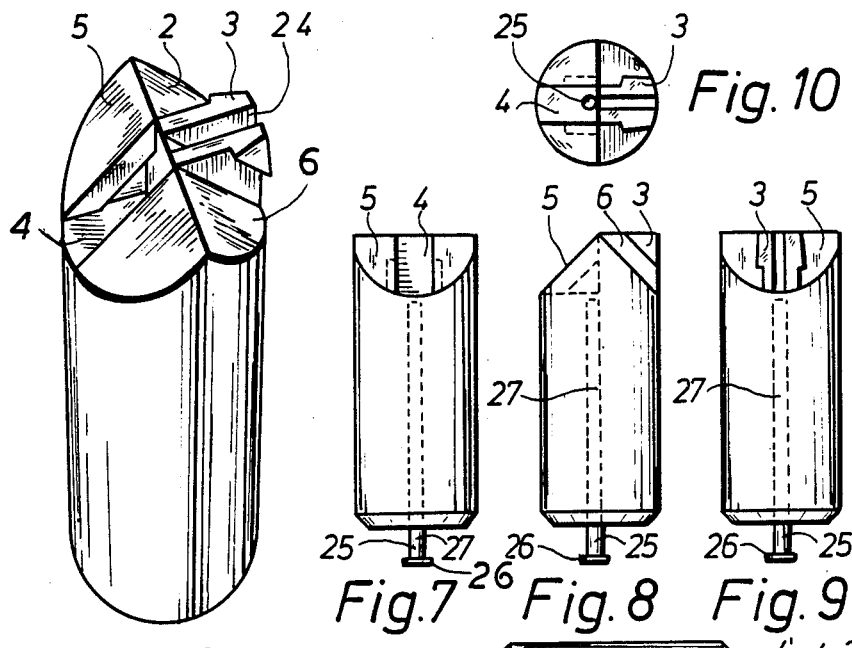
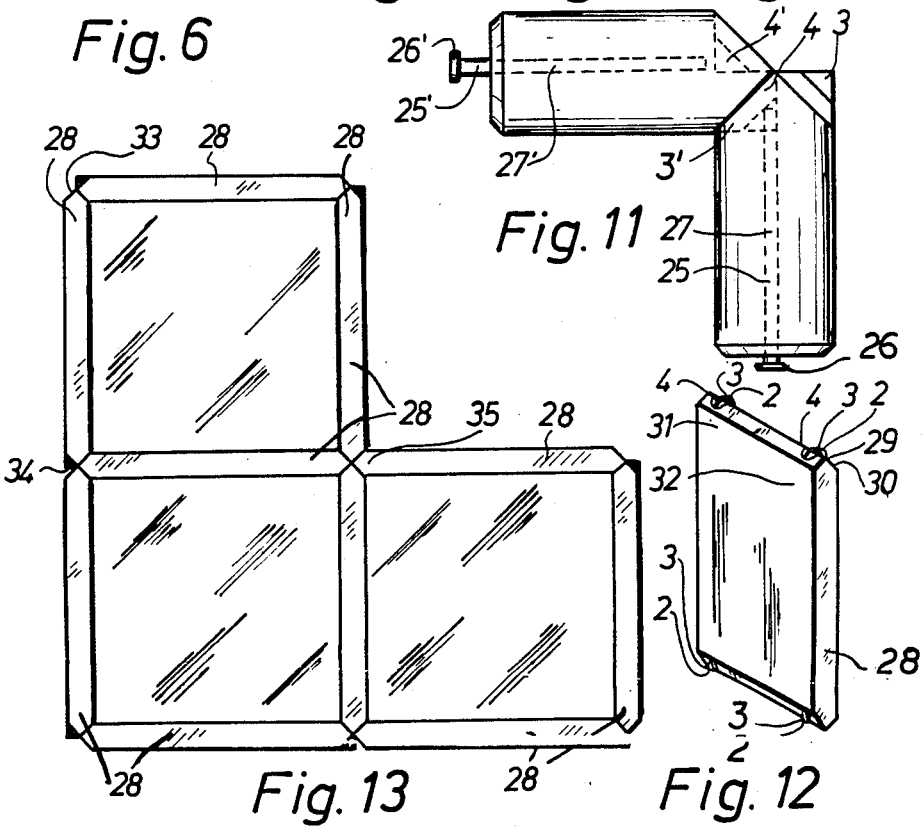

4,610,563

DOWEL FOR ASSEMBLING FURNITURE PARTS

TECHNICAL FIELD

The invention relates to a dowel for assembling adjacent ends preferably of furniture parts and constructed in such a manner that it is capable of being fastened in a bore of the individual furniture part, an exposed head by the assembling being constructed to engage an adjacent head of a similar dowel of another furniture part.

BACKGROUND ART

Dowels are known for assembling furniture parts, in which a dowel having a protruding part is mounted in one furniture part, whereas in the other furniture part a dowel is mounted having a receiving part, into which the protruding part is adapted to be received by snapping the receiving part. Consequently, two different dowels are always required for assembling furniture parts, said dowels being adapted to cooperate with each other. It is thus essential that the user is careful always to use one of each type, which may sometimes imply inconvenient delays in the work with such dowels and in the handling of the furniture parts in question.

DISCLOSURE OF INVENTION

The dowel according to the invention is characterised in that on the head the dowel comprises a protruding part as well as a receiving part, said parts being shaped so that the protruding part of the dowel may be snapped into the receiving part of a similar dowel and be maintained substantially immovable herein.

It is hereby obtained that the user has to handle only a single dowel. It is true that this dowel must be mounted correctly relative to the corresponding dowel, but this is fairly easy to accomplish.

According to the invention the head may be tapered so that it comprises substantially two plane surfaces forming an angle, preferably of 90°, with each other and intersecting immediately adjacent to the middle of the head, and the protruding part and the receiving part may be associated with respective plane surfaces and may each be of such a shape that the corresponding plane surface abuts the plane surface of the corresponding part of the other similar dowel. It is hereby in a very simple manner made possible to assemble the angular parts in question with the desired mutual angles, of e.g. 90°.

The dowel according to the invention may also be of a substantially circular cross-section and may be hollow; the receiving part may be constituted by a centrally located, radial, rectangular aperture which is formed in the corresponding plane surface extending from the intersection of the two plane surfaces, and which inwardly in the dowel leads into the inner cavity, and the protruding part may be of a corresponding, substantially rectangular shape with a corresponding, central location on its adjacent plane surface, and the protruding part at the outer end may comprise an enlargement adapted to be received in the inner cavity of a corresponding dowel. A dowel is hereby obtained which is very simple to use and easy to manufacture.

Furthermore according to the invention the dowel may comprise axial slits issuing from the receiving part, whereby said receiving part in a simple way is made resilient or yielding to effect snap action, even if the material used for the manufacture of the dowel is comparatively hard.

Moreover according to the invention the dowel may comprise a centrally located slit through the protruding part, said slit extending symmetrically around an axial plane through the central axis of the dowel, whereby the snap action may be effected in a simple manner at the resilient, protruding part.

According to the invention the dowel may comprise a locking device, which by actuation from the outside is adapted to pass from the inner of the dowel into the central slit through the protruding part and to abut opposite sides of the slit. A simple way of locking the furniture parts is hereby obtained with no possibility of the cooperating dowels being detached.

In an especially advantageous embodiment the protruding part, viewed in the direction of the intersection of the two plane surfaces may be triangular, and the two adjacent free surfaces of the protruding part may be adapted when engaging a second dowel to abut corresponding surfaces at the receiving part. A good support of the joined dowels is hereby obtained so that together they show good stability.

Finally the dowel may have a detachable cap of a complemental head, said cap consisting of a receiving part and a protruding part. It is hereby possible to hide unused dowels conveniently by mounting such a cap.

BRIEF DESCRIPTION OF THE DRAWING

The invention will be described below with reference to the accompanying drawing, in which

FIG. 6 is a perspective view of another embodiment according to the invention, FIGS. 7, 8, and 9 illustrate the same dowel, viewed from different sides, with a locking device for cooperation with the protruding part of a corresponding dowel, FIG. 10 is a top view of the dowel shown in FIG. 8, FIG. 11 illustrates two dowels of the embodiment shown in FIGS. 8-10 in engagement with each other and in which the locking device of one of the dowels is in locking position relative to the protruding part of the other dowel.

FIG. 12 is a perspective view of a furniture part, with two dowels according to the invention mounted in both ends and ready for use in assembling corresponding furniture parts, and FIG. 13 illustrates several furniture parts of the type shown in FIG. 12 assembled in an arrangement of bookshelves by means of dowels according to the invention.

BEST MODE FOR CARRYING OUT THE INVENTION

Figure 1:
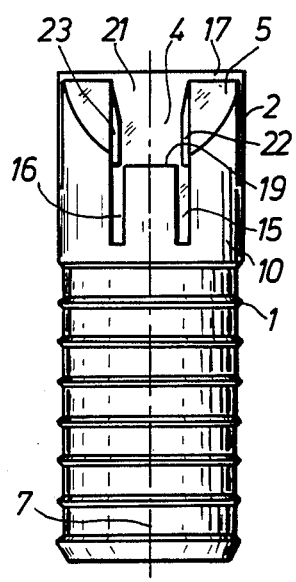
FIG. 1 is a side view of the dowel according to the invention.
Figure 2:
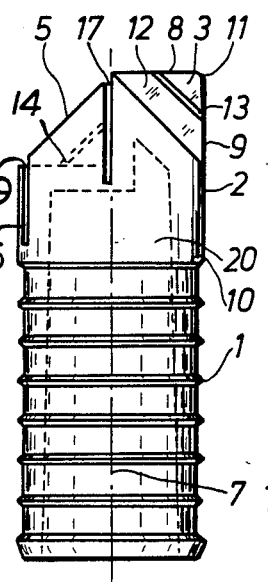
FIG. 2 is a side view, perpendicular to the side view of FIG. 1, of the dowel.
Figure 3:
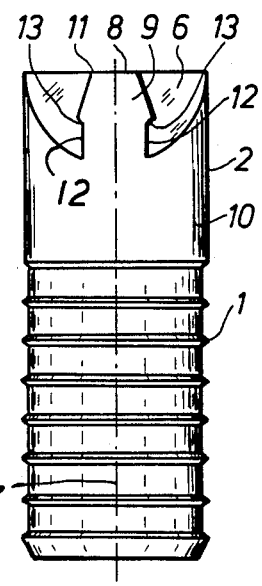
FIG. 3 illustrates the dowel, viewed from the opposite side of FIG. 1.

The dowel shown in FIGS. 1-3 is of a substantially cylindrical shape with a row of circumferential ribs 1 shaped around the bottom area of the dowel and adapted for maintaining the dowel in a corresponding aperture in a furniture part. The opposite upper end, the head 2, of the dowel comprises a protruding part 3 and a receiving part 4. The protruding part and the receiving part are associated with respective plane surfaces 5, 6 intersecting under an angle of 90° along a line perpendicular to the axis 7 of the dowel. The protruding part 3 is as shown in FIG. 2 triangular, viewed in a direction parallel to the line of intersection of the plane surfaces. One of the exposed surfaces 8 of the protruding part 3 is formed perpendicular to the axis 7 of the dowel, whereas the other exposed surface 9 extends integrally and aligned with the cylindrical surface 10 of the dowel. As it appears from FIG. 3 the protruding part 3 is symmetrical in relation to the plane containing the central axis 7 and located perpendicular to the adjacent plane surface 6. In connection with the symmetrical shape the protruding part 3 is tapered slightly in a direction towards the free edge. Nearest to the plane surface 6 the protruding part 3 has a recess 12, which on the outside is connected with the tapered surfaces by an outwardly extending side 13 which in its longitudinal direction extends parallel to the plane surface 6.

The receiving part 4 (cf. especially FIG. 1) is shaped as a slit extending into the corresponding plane surface 5 and symmetrically around the same plane as the one around which the protruding part is symmetrical. Besides the receiving part 4 is shaped to receive by snapping a protruding part 3 on a corresponding dowel, as the corresponding plane surfaces 5 and 6 will abut each other, and simultaneously the sides 13, which on the outside define the recess 12 of the corresponding protruding part, abut corresponding sides 14 within the receiving part 4.

As indicated by dotted lines in FIG. 2 the dowel is hollow, and the slit-shaped receiving part is thereby directly connected to the inner cavity of the dowel. Beyond this the dowel comprises axially extending slits 15, 16, 17 adjacent the receiving part 4, as the slits 15, 16, 17 extend from the bottom end of the receiving part 4 in a direction away from the head of the dowel, whereas the slit 17 is adjacent to the upper end of the receiving part 4, said slit, as it appears from FIGS. 1 and 2, extending diagonally parallel to the line of intersection of the two plane surfaces 5, 6. Said slits 15, 16, 17 enable the parts of the dowel abutting the receiving part 4 to yield when a protruding part 3 is inserted, despite the fact that the dowel, which is suitably injection moulded, is made of a relatively hard material, e.g. polyamide. The dowel may of course also be made of other materials.

As it appears from FIGS. 1 and 2 the receiving part is at the bottom limited by a plane surface 19 extending perpendicular to the central axis of the dowel as far as the connection of the receiving part with the inner cavity 20. Similarly, the dowel is shaped in such a way that the upper part of the receiving part 4 is defined by a plane surface 21 extending perpendicular to the symmetry plane of the receiving part and containing the central axis 7 of the dowel. As a result the protruding part 3—located in the receiving part 4—of another dowel is supported solidly on these surfaces, so that the thus cooperating dowels engage each other steadily.

In order to facilitate the insertion of a protruding part 3 in the receiving part 4 the latter is as indicated in FIG. 1 externally shaped with bevelled surfaces 22 and 23, respectively, inclining towards each other.

Figure 4:
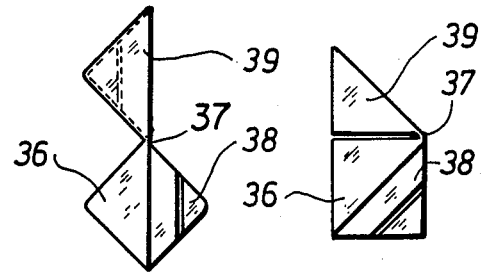
FIG. 4 is a side view of a preferred embodiment of a cap for the dowel shown in FIGS. 1-3.
Figure 5:
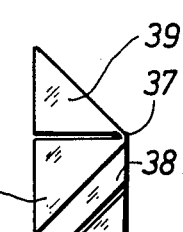
FIG. 5 illustrates the dowel shown in FIG. 4, viewed in a position in which it is when mounted on two adjacent dowel heads on a visible T-joint in an arrangement of bookshelves.

A cap 36 may be attached to the dowel (cf. FIGS. 4 and 5), said cap comprising a protruding part 38 and a receiving part 39 corresponding completely to the protruding part 3 and the receiving part 4 of the corresponding dowel. The cap is shaped in such a manner that a hinge 37 is located between the two parts containing the protruding part 38 and the receiving part 39, respectively. Said hinge 37, which is advantageously integral with the remaining part of the cap 36, permits the cap to be adapted to be placed on one and the same dowel as well as to be placed in engagement with adjacent parts of two dowels in a joint, as described more explicitly below. The cap may moreover be of many different shapes and may optionally form part of a protective strip for protecting the edge of a furniture part, on which exposed dowel parts are located.

The embodiment of the dowel according to the invention shown in FIGS. 1–3 is as mentioned constructed so that the receiving part 4 permits the yielding or resiliency necessary for the snap action.

In the embodiment of the invention shown in FIGS. 6–10 the necessary resiliency is, however, ensured in connection with the protruding part 3. The embodiment shown here corresponds to the embodiment shown in FIGS. 1–3 apart from the fact that it does not comprise the slits 15, 16, and 17 connected to the receiving part 4, but on the contrary a slit 24 extending through the centre of the protruding part 3 symmetrically around the symmetry plane of the protruding part. The slit 24 extends as far as the plane containing the corresponding plane surface 6. The slit 24 permits the protruding part to yield inward towards the central plane of the slit.

The resiliency described here in connection with the protruding part 3 also enables the dowel to be provided with a locking device 25 (cf. FIGS. 7–10), which in the case shown consists of a head 26 and an elongated annular shank 27. The locking device is of such a length, that its head is located a distance outside the bottom end of the dowel, whereas the shank 27 extends to the close vicinity of the bottom area of the receiving part, as shown in FIG. 8. In the inside of the cavity of the dowel the locking device 25 is steered by means (not shown) in such a way that it is easily displaceable and is always located in the symmetry plane of the receiving part, substantially parallel to the axis of the dowel. Besides the shank is of such a shape that it may pass unhindered into the slit 24 in a protruding part 3 located in the receiving part 4 and may prevent said protruding part from yielding at attempts to remove it from the receiving part 4. Such a situation is shown in FIG. 11, where the two dowels are conducted into engagement with each other, as one of the dowels are shown with the reference with no mark, whereas the other dowel is provided with the reference number with a mark. As it is apparent, the locking device 25 is pushed forward towards the head of the corresponding dowel and in between the branches of the protruding part 3' of the other part.

FIG. 12 illustrates a furniture plate 28, which in both ends are provided with two dowels of the type shown in FIGS. 6–10. The dowels are disposed in suitable bores in the furniture plate 28. Furthermore at its ends the furniture plate is obliquely cut off so that it comprises end surfaces 29, 30 flushing with the plane surfaces 5 and 6, respectively, of the respective dowels. As indicated in FIG. 12, the furniture plates are further provided with apertures 31 and 32 adapted to admit the insertion of a screwdriver or a similar tool behind the bottom end of the individual dowel and to push the locking device into locking position when desired.

FIG. 13 illustrates several furniture plates of the type shown in FIG. 12 assembled to part of a bookshelf system. There are thus examples of an ordinary angle joint at 33, of a T-joint at 34 and of a cross joint at 35, and a characteristic feature of this joint is that the dowels make it possible to obtain these joints without it being necessary to place two furniture parts on top of each other or side by side.

The ends of the surfaces 29, 30 of the individual furniture parts, which in the embodiment shown extend perpendicular to each other, and the corresponding shape of the dowel having an angle of 90° between the plane surfaces 5, 6 thus ensure that in an arrangement of bookshelves made by means of such furniture parts 28 a load may be transferred from a horizontal shelf to a vertical wall—without the movable parts in the cooperating dowels being stressed, so that they may be released. It is further noted that the furniture parts 28 may be used as the bottom shelves of a bookshelf-system, in which the load of one shelf is absorbed by adjacent vertical sides. This is especially due to the possibility of locking the movable parts by locking devices 25.

As it appears from FIG. 12 there will along exposed joints be exposed abutting dowel parts. These exposed parts may advantageously be hidden or protected by means of caps 36 of the type shown in FIGS. 4 and 5, which because of the hinge 37 are capable of being adapted to the individual joint. The state of the cap 36 shown in FIG. 4 can thus be used in connection with an angle joint, whereas the state shown in FIG. 5 may be used in connection with T-joints.

Finally it should be emphasized that the embodiments of the dowel shown permit the dowels, which are to be brought into engagement with each other in for instance an angle joint, to be assembled in the direction of the axis of one of the dowels as well as of the other dowel, and they may be assembled by a parallel displacement of one dowel relative to the other, in any direction within a range of 90° inside the axis directions. This facilitates the assembling process considerably.

The invention has been described with reference to preferred embodiments. Many deviations may of course be made without deviating from the scope of the invention. The plane surfaces 5 and 6 may thus have other mutual inclinations, if such special inclinations are desired in special joints.

I claim:

1. A dowel for assembling adjacent ends preferably of furniture parts (28) and constructed in such a manner that is is capable of being fastened in a bore of the individual furniture part, the dowel comprising an exposed head (2) constructed to engage an adjacent head (2) of a similar dowel of another furniture part (28) where the head (2) of the dowel comprises a protruding part (3) as well as a receiving part (4), said parts being shaped so that the protruding part (3) of the dowel may be snapped into the receiving part (4) of a similar dowel and be maintained substantially immovable therein, and where the head (2) is tapered so that it comprises substantially two plane surfaces (5, 6) forming an angle with respect to such other and intersecting immediately adjacent to the middle of the head (2), the protruding part (3) and the receiving part (4) being associated with respective plane surfaces (5,6) and being each of such a shape that the corresponding plane surface (5,6) abuts the plane surface (6,5) of the corresponding part of the other similar dowel, the receiving part (4) being constituted by a centrally located, radial, rectangular aperture which is formed in the corresponding plane surface (5) extending from the intersection of the two plane surfaces (5, 6) and which leads inwardly into the inner cavity (20) of the dowel, and the protruding part (3) being of a corresponding, substantially rectangular shape with a corresponding, central location on its adjacent plane surface (6), the protruding part (3) at the other end comprises an enlargement adapted to be received in the inner cavity (20) of a corresponding dowel.

2. A dowel according to claim 1, further comprising axial slits (15, 16, and 17) issuing from the receiving part (4).

3. A dowel according to claim 1, further comprising a centrally located slit (24) through the protruding part (3), said slit extending symmetrically around an axial plane through the central axis (7) of the dowel.

4. A dowel according to claim 3, characterised by comprising a locking device (25) which by actuation from the outside is adpated to pass from the inner of the dowel into the central slit (24) through the protruding part (3) and to abut opposite sides of the slit (24).

5. A dowel according to claim 1, wherein the protruding part (3), viewed in the direction of the intersection of the two plane surfaces, is triangular, and in that the two adjacent free surfaces (8, 9) of the protruding part (3) are adapted when engaging a second dowel to abut corresponding surfaces (21 and 29, respectively) at the receiving part (4).

6. A dowel according to claim 1, further comprising a detachable cap (36) of a complemental head (2), said cap consisting of a receiving part (39) and a protruding part (38).

7. A dowel according to claim 6, characterised in that the two parts of the cap (36) are interconnected by means of a hinge (37).

* * * * *

UNITED STATES PATENT AND TRADEMARK OFFICE
CERTIFICATE OF CORRECTION

PATENT NO.  : 4,610,563
DATED       : September 9, 1986
INVENTOR(S) : Steen Østergaard It is certified that error appears in the above-identified patent and that said Letters Patent is hereby corrected as shown below:

Col. 6, Line  8, change "such" to --each--.

Col. 6, Line 36, change "adpated" to --adapted--.

Col. 6, Line 44, change "29" to --19--.

Signed and Sealed this

Sixteenth Day of December, 1986

Attest:

DONALD J. QUIGG

Attesting Officer

Commissioner of Patents and Trademarks